(12) United States Patent
Borman et al.

(10) Patent No.: US 7,711,920 B2
(45) Date of Patent: May 4, 2010

(54) METHOD AND SYSTEM FOR DYNAMICALLY MANAGING STORAGE OF DATA OBJECTS GENERATED DURING EXECUTION OF A COMPUTER PROGRAM

(75) Inventors: Sam D. Borman, Ampleforth (GB); Saket Rungta, Winchester (GB); Andrew D. Wharmby, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 11/426,199

(22) Filed: Jun. 23, 2006

(65) Prior Publication Data
US 2006/0294167 A1 Dec. 28, 2006

(51) Int. Cl.
*G06F 13/00* (2006.01)
*G06F 17/30* (2006.01)

(52) U.S. Cl. .................. 711/170; 711/152; 711/154; 711/163; 707/206

(58) Field of Classification Search .............. 711/152, 711/154, 163; 707/206
See application file for complete search history.

(56) References Cited

U.S. PATENT DOCUMENTS 6,865,657 B1 * 3/2005 Traversat et al. ............. 711/170
2003/0005027 A1 * 1/2003 Borman et al. .............. 709/104

FOREIGN PATENT DOCUMENTS

GB 0512809.5 6/2005
GB 0607764.8 4/2006

* cited by examiner

*Primary Examiner*—Mardochee Chery
(74) *Attorney, Agent, or Firm*—Yee & Associates, P.C.; David A. Mims, Jr.

(57) ABSTRACT

Method and system for managing a heap. A map is employed to indicate which areas of the heap are inaccessible to a program. Such areas constitute garbage which is potentially returnable to a data structure which identifies free storage available for reallocation to the program. By choosing map entries corresponding to portions of storage whose size is of the same order of magnitude as a predetermined minimum unit size for the data structure, a small map can be used. Such a map can be scanned more quickly than a larger map of higher granularity to identify only relatively larger areas of garbage for reallocation.

33 Claims, 5 Drawing Sheets

METHOD AND SYSTEM FOR DYNAMICALLY MANAGING STORAGE OF DATA OBJECTS GENERATED DURING EXECUTION OF A COMPUTER PROGRAM

CROSS REFERENCE TO RELATED APPLICATIONS

This application claims priority of United Kingdom Patent Applications No. 0512809.5 filed on Jun. 23, 2005, and entitled "Arrangement and Method for Garbage Collection in a Computer System," and No. 0607764.8 filed on Apr. 20, 2006, and entitled "Probable-conservative Collection Using a Meta-markmap" which are both herein incorporated by reference in their entirety and for all purposes.

FIELD OF THE INVENTION

This invention relates to the dynamic management of storage of data objects generated during execution of a computer program.

BACKGROUND OF THE INVENTION

In a computer system, programs and data reside in physical storage, such as RAM or disk but are addressable in virtual memory, defined by the operating system. When a computer program is executed, the operating system establishes a run time environment. In the run time environment, storage must be allocated by the system not only for any external data needed by the program but also for data generated by the program itself. Several methods of storage allocation are known. Static allocation binds all names in the program to fixed storage locations at compile time. This is the oldest and least flexible technique but may still be used for storage of dynamically loadable library (DLL) files used by a program. Dynamic allocation of storage requires the creation of data structures in dedicated areas of memory known as the "stack*" and the "heap". Typically, modern programming language compilers or run time environments may provide all three types of storage under overall system control.

The stack is typically a push down stack (last-in-first-out) and is used for data which must be organised and retrieved in a known and controlled manner. The heap is used for storage of transient data such as intermediate results and variable values which may not be needed for more than a short time during execution. Data structures in a heap may be allocated and deallocated in any order.

During program execution, the allocation of free virtual memory is managed by means of "free lists" which are data structures containing pointers to storage locations in a free pool of memory which are available to a requesting program. There must of course be limits on the amount of storage which can be allocated to any particular program. In the case of the heap, a large amount of transient data may be generated by the program. In order for the heap not to become full, storage must be deallocated by the program as its contents become redundant.

However, because of the dynamic aspect of heap allocation and the transient nature of the program operations carried out on heap data, it is quite frequently the case that pointers to stored data objects may be destroyed after the objects have been used by the program, without the data object storage being explicitly deallocated. This means that the data object has become unreachable by the program. A single instance of this is referred to as a "leak*" and collectively, all the leaks are referred to as •garbage".

Automatic techniques known collectively as "garbage collection" have been developed to identify such garbage data and to reallocate its storage for reuse by the program. An in-depth treatise on the subject may be found in the book "Garbage Collection—Algorithms for Automatic Dynamic Memory Management" by Richard Jones and Rafael Lins (Wiley, 1996, ISBN 0471941484.)

In the field of this invention it is known that garbage collection is a part of a programming language's runtime system, or an add-on library, perhaps assisted by the compiler, the hardware, the operating system, or any combination of the three, that automatically determines what memory—a program is no longer using, and recycles it for other use. It is also known as "automatic storage (or memory) reclamation". One example of a managed runtime programming language relying on garbage collection is the Java programming language (Java and all Java-based trademarks are trademarks of Sun Microsystems, Inc. in the United States, other countries, or both). Another example is the Visual C# language and .NET programming framework from Microsoft Corporation (Visual C# is a trademark of Microsoft Corporation in the United States, other countries, or both).

Automatic garbage collection is preferred to explicit memory management by the programmer, which is time consuming and error prone, since most programs often create leaks, particularly programs using exception-handling and/or threads. The benefits of garbage collection are increased reliability, decoupling of memory management from class interface design, and less developer time spent chasing memory management errors. However, garbage collection is not without its costs, including performance impact, pauses, configuration complexity, and non-deterministic finalization.

A common method of garbage collection, many versions of which are described in detail in the above referenced book, is known as "mark-sweep", where allocated memory (that is, memory corresponding to accessible data objects) is first marked and a collector then sweeps the heap and collects unmarked memory for re-allocation. Broadly, the marking phase traces all live objects in the heap by following pointer chains from "roots" to which the program has access. Roots may typically be in the program stack or in processor registers. When a data object on the heap is reached, it is marked, typically by setting a bit in a mark map representing the heap storage, although alternatively, an extra bit could be set in the object itself. When all reachable objects have been traced, any other objects must be garbage. The sweep phase uses the marking results to identify unmarked data as garbage and returns the garbage containing areas to the free list for reallocation. An entire collection may be performed at once while the user program is suspended (so-called 'stop-the-world' collection). Alternatively, the collector may run incrementally (the entire heap not being collected at once, resulting in shorter collection pauses).

However, these approaches have the disadvantages that the sweep phase of garbage collection can take a significant part of the pause time (greater than 50%). An alternative is to run the collector process concurrently whereby the user program assists the garbage collection process being performed by the system. Typically, the amount of work done by a user program thread is a function of the amount of transient storage allocated by it. However, "concurrent sweep", as this is known, has the drawback of decreasing application throughput In addition to the Jones and Lin book, reference is also made to a paper entitled "Dynamic selection of application specific garbage collectors" by S. Soman et al., (ISMM'04 Oct. 24-25, 2004 Vancouver, Copyright 2004 ACM). This paper reports results achieved using five different known methods of garbage collection and recommends switching between the methods for the greatest efficiency. However, it does not suggest how to increase the speed of garbage collection.

A need therefore exists for a garbage collection technique wherein the above mentioned disadvantage(s) may be alleviated.

DISCLOSURE OF THE INVENTION

In accordance with a first aspect of the present invention there is provided a method for dynamically managing storage of data objects generated during execution of a computer program in a dedicated area of computer memory, said data objects potentially becoming inaccessible to the program in the course of execution, the method comprising the steps of: maintaining a free storage data structure for identifying free portions of the dedicated area of memory available for storage of data objects in response to a program request, the free portions having a predetermined minimum unit size; locating data objects stored in the dedicated area of memory which are accessible to the program; producing, in response to said locating step, a map of at least part of the dedicated area of memory having a plurality of entries, each entry corresponding to a fixed size portion of said dedicated area of memory and indicating whether or not that fixed size portion of memory contains accessible data objects or not; selecting, with reference to said map entries, contiguous portions of memory not containing any accessible data objects, which portions are at least equal in size to said predetermined minimum unit size; and returning said selected portions of memory to said free storage data structure for reallocation of storage to the program; wherein the size of each portion of memory corresponding to a map entry is chosen to be of the same order of magnitude as said predetermined minimum unit size.

In accordance with a second aspect of the present invention there is provided a storage management system for dynamically managing storage of computer program generated data objects in a dedicated area of computer memory forming part of a data processing system, said storage management system comprising: a free storage data structure for identifying free portions of the dedicated area of memory available for storage of data objects in response to a program request, the free portions having a predetermined minimum unit size; means for locating data objects stored in the dedicated area of memory which are accessible to the program or not; means for producing, in response to said locating means, a map of at least part of the dedicated area of memory having a plurality of entries, each entry corresponding to a fixed size portion of said dedicated area of memory and indicating whether or not that fixed size portion of memory contains accessible data objects or not; means for selecting, with reference to said map entries, contiguous portions of memory not containing any accessible data objects, which portions are at least equal in size to said predetermined minimum unit size; and means for returning said selected portions of memory to said free storage data structure for reallocation of storage to the program; wherein the size of each portion of memory corresponding to a map entry is chosen to be of the same order of magnitude as the size of said predetermined minimum unit size.

In a third aspect, the invention provides a computer program for data storage management comprising instructions which, when executed in a data processing system, cause the system to carry out the steps of the above method.

By making the portions of memory to which the map entries correspond as large as or at least of the same order of magnitude as the predetermined minimum unit size, a much quicker selection of storage for reallocation can be made, albeit by ignoring smaller areas which a map of finer granularity could have identified. This approach can be likened to the picking of only "low hanging fruit". Although the invention is described below in the context of garbage collection from a heap memory it may also be generally applicable to storage management of other types of memory.

Preferably, a map of the entire dedicated area of memory is produced and the execution of the program is halted until all garbage is identified and storage is returned (the so-called "stop the world* approach). Alternatively, the mapping, selection and return operations could be carried out incrementally or concurrently to reduce the length of the interruption in execution.

Preferably, each fixed size portion of the dedicated area of memory corresponding to a map entry is half the size of the predetermined minimum unit size. Selected fixed size portions of memory corresponding to two or more map entries indicating no accessible data objects, which amount to at least the size of the predetermined minimum unit size, can then be returned to the free storage data structure. Alternatively, the portions of memory could be the same size as the predetermined minimum unit size.

It is preferred that the map is a secondary map each of whose entries corresponds to a respective plurality of entries of a primary map generated from the dedicated area of computer memory, each primary map entry indicating, for each of the smallest constituent units of a data object, whether the data stored in that unit is either accessible by the program or else is inaccessible or unassigned. This not only facilitates map generation but also enables the collection of garbage to be extended to smaller portions, if required. Two approaches are possible.

In the first approach, the predetermined minimum sized portions of memory retrieved using the secondary map are simply supplemented by referring to the primary map and combining any contiguous preceding or following free space to the already identified portions of memory for return.

The second approach is to use the secondary map to identify half size units of storage, not large enough for return in their own right, and to check, using the primary map, if there is sufficient space in any contiguous preceding and following areas to be combinable into a full minimum sized unit, which can then be returned for reallocation.

Clearly, both of these approaches will be slower than using the secondary map alone to identify free space for reallocation but may be worth doing if memory is at a premium or is very fragmented, as scanning of the secondary map to identify the principal portions for return will still improve the overall speed of collection.

A preferred embodiment of the invention offers three different configurations of sweep phase, equivalent to the three techniques of selecting garbage outlined above and provides for switching between the three phases in dependence on predetermined criteria.

A further preferred feature, where a bit vector map is used, is to read a plurality of bits, such as a word, at a time. If no bits are set to indicate the presence of accessible data objects, all portions of memory-corresponding to the plurality of bits, along with similar unset contiguous plurality of bits in following words, if any, can be returned to the free list without further detailed examination of the map being necessary.

Reading and comparing words is a fast and established function generally provided in computer systems.

BRIEF DESCRIPTION OF THE DRAWINGS

The present invention will now be described further, by way of example only, with reference to preferred embodiments thereof, as illustrated in the accompanying drawings, in which.

DESCRIPTION OF PREFERRED
EMBODIMENT(S)

As explained above, one well known technique of garbage collection typically employs a mark-map, to determine live/dead objects in the memory heap of a computer system, e.g., a Java Virtual Machine.

The mark-map is a bit-vector such that there is 1 bit for every object_grain_size bytes of heap, i.e., 1 byte (8 bits) for each {8* object_grain_size) bytes of heap. Thus, the size of the mark-map in bytes is:

((heap size in bytes)/(8* object_grain_size)), where object_grain_size is the smallest constituent unit of a data object.

For example, assuming object_grain_size=4 bytes and a heap of 1000MB in size, the mark-map will have a size of 1000MB/(8*4)=31.250 MB. (Note MB in this document refers to a megabyte, i.e., 1024*1024 bytes and not as one million bytes, i.e., 1000*1000 bytes.)

Conventionally, in garbage collection using such a mark-map, the majority of stop-the-world sweep time is spent in touching and walking over this large mark-map (31.250 MB). ("Touching and walking" is a term of art for seeking to an initial address in virtual memory and extracting or scanning a multiple bit stream following the initial address, irrespective of physical memory boundaries between cache, RAM and disk. It arises because the physical implementation of a virtual memory is not flat but hierarchical.)

Figure 1:
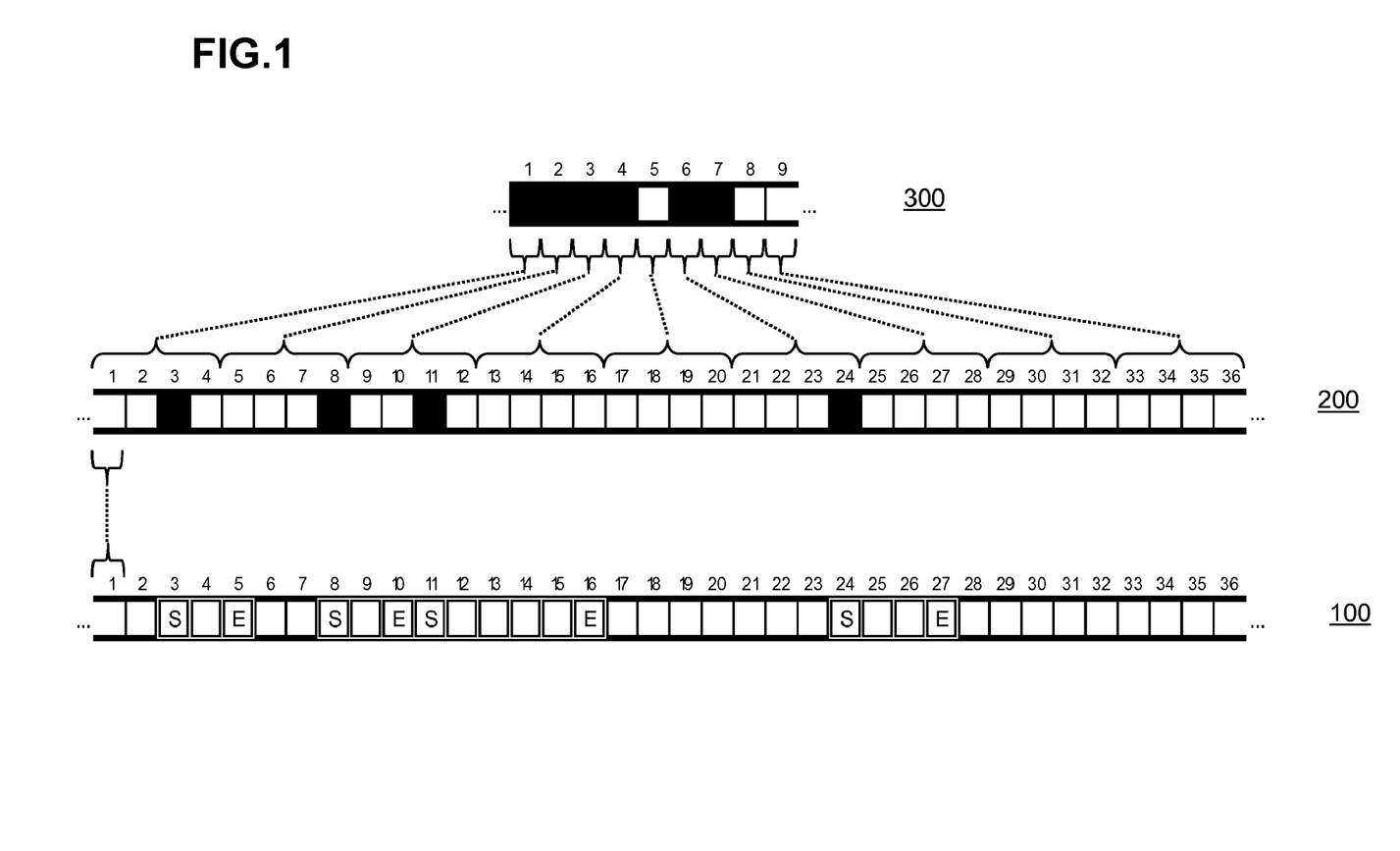
FIG. 1 shows schematically a memory heap, a mark-map and a meta-mark-map used in a method and system for dynamically managing storage of data objects generated during execution of a computer program according to the present invention.

Referring now to FIG. 1, the present invention is based upon a secondary map, referred to as a meta-mark-map, which is another bit-vector such that each meta-mark-map bit maps to N mark-map (or primary map) bits, effectively giving a compression of N:1. The illustration of FIG. 1 shows part of a memory heap 100, mark-map 200 and meta-mark-map 300.

As illustrated in FIG. 1, in the heap 100 each unit or box represents A bits of memory, where A=(8*object_grain_size). Each unit or box shown with a double-line border represents part of a marked or set object, with the start and end of an object being indicated respectively by a box labelled 'S' and a box labelled $^X$E'. In the mark-map 200, each unit or box represents 1 bit and maps to a respective group of A bits of the memory heap. In the meta-mark-map 300, each unit or box represents 1 bit and maps to a respective group of N bits of the mark-map 200. For ease of illustration, N=4 is chosen for the example shown.

In the meta-mark-map 300 and the mark-map 200, a hatched box represents a set bit and un-hatched box represents an unset bit. Vertical hatching indicates a physically set bit, and horizontal hatching indicates a logically set bit, using the following scheme. In the present example, a bit is set (here called a physical bit) only for the start of an object in the mark-map (e.g., bit 3 in FIG. 1 for the first object), and the other bits for the object represented in the mark-map are termed 'logically set'. In the present example, while processing the mark-map, bits. 4 and 5 are inferred to be set for the first object, by looking at the meta-data for the object represented by bit 3. This is better for performance than physically setting all the corresponding bits in the mark-map (i.e., setting bits 3, 4 and 5). However, it will be understood that this scheme of physical and logical setting of mark-maps is not an absolute requirement and that some garbage collectors may alternatively physically set bits 3, 4, 5.

Thus, it can be seen that the marked or set objects depicted in boxes 1-36 of the heap 100 as illustrated in FIG. 1 produces a pattern of set bits depicted by the hatching of boxes 1-36 of the mark-map 200 as illustrated. Further, it can be seen that the marked or set objects depicted in boxes 1-36 of the mark-map 200 as illustrated in FIG. 1 produce a pattern of set bits depicted by the hatching of boxes 1-9 of the meta-mark-map 300 as illustrated.

Figure 2:
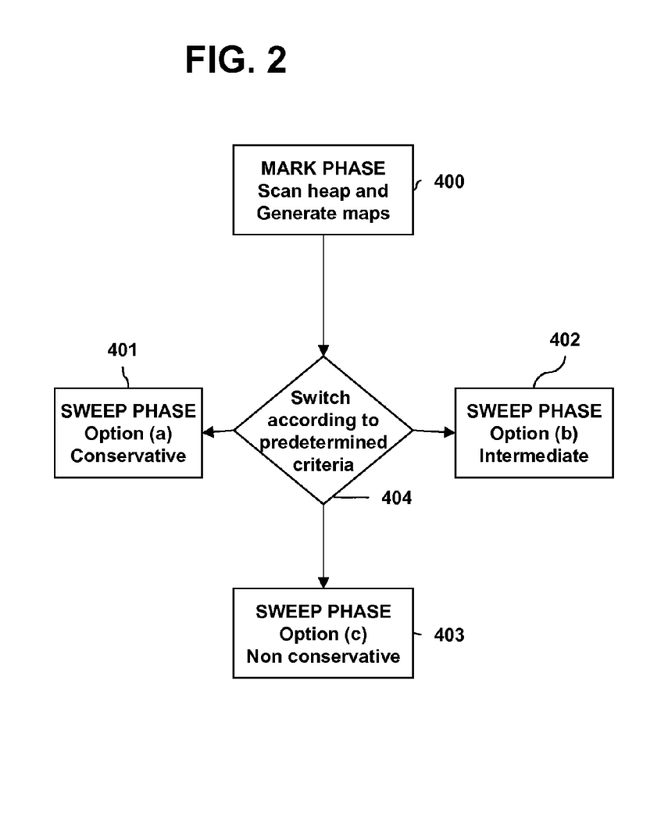
FIG. 2 is an overview flow diagram of a method of dynamically managing storage of data objects generated during execution of a computer program according to the present invention, including three selectable sweep phase options.
Figure 3:
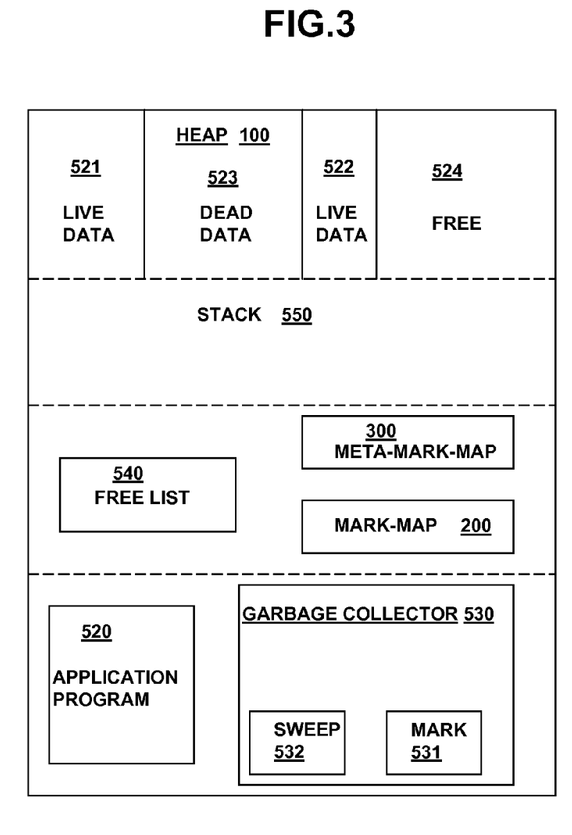
FIG. 3 shows the location in virtual memory address space of code components of a storage management system according to the invention, employed in carrying out the method of FIG. 2.

Referring now also to FIG. 2 in conjunction with FIG. 3, which shows the location of code and data referred to in the memory address space, a preferred example of a method of dynamically managing storage of data objects generated during execution of a computer program, according to the invention, will now be described in overview. In FIG. 3, the address space is shown as being divided into a program code section holding an application program 520 and a garbage collector program 530, a static storage section in which mark-map 200, meta-mark-map 300 and free list 540 are stored, a stack section 550 and finally the heap storage section 100. The method of FIG. 2 employs a shared marking technique for generating the mark-map 200 and meta-mark-map 300 but offers three possible sweep (collection) variants, which may be chosen or switched between either statically or dynamically, in dependence upon garbage collection accuracy and completeness requirements.

Thus, mark code 531 (FIG. 3), in shared mark phase 400 (FIG. 2) generates mark-map 200 and meta-mark-map 300 from heap 100. Sweep code 532 scans the maps to collect free storage for reallocation and returns it to free storage data structure (free list) 540 for reallocation. The sweep code is capable of adopting three differing approaches to garbage collection: a conservative option (a), shown as step 401, an intermediate option (b), shown as step 402 and a non-conservative option (c), shown as step 403. The difference between these approaches will become clear from the more detailed description below. A .switch step 404 is shown in FIG. 2 for determining which option is to be selected according to predetermined criteria.

Figure 4:
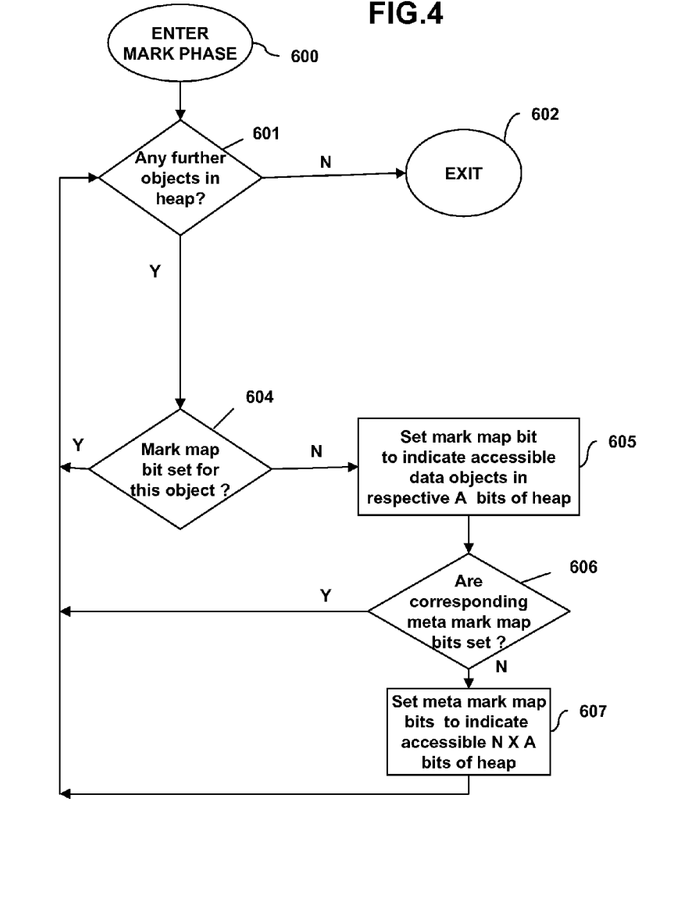
FIG. 4 is a flow diagram showing the mark phase of the method of FIG. 2.

The detailed steps of mark phase 400 are shown in FIG. 4. After entering the mark phase at 600, the heap 100 is traced from roots in or associated with application program 520 by following pointers to determine which objects are live. If data objects in the heap are reached, they are accessible to the program ('live'), whereas if they cannot be reached, they are considered "dead". For ease of explanation only, heap 100 is shown, in FIG. 3, with two live data areas 521 and 522, a dead area 523 and an as yet unused area 524. In practice, the pattern and number of such areas in the heap will be greater and more complex than that shown. If no more objects are found, the program exits from the mark phase at 602. For each object found then at step 604 it is determined whether the corresponding mark-map bit is already set. If so, the program returns to step 601 to look for the next live object. If the mark-map bit is not set, then it is set in step 605 to indicate an accessible data object in the respective A bits of the heap.

Next, in step 606, it is determined whether meta-mark-map bit(s) are set corresponding to the mark-map bit set in step 605. If already set, the program returns to step 601 and, if not, the meta-mark-map bit(s) are set to indicate the presence of set bits in the respective N bits of the mark-map.

In practice, although in the illustrated example of FIG. 1, N=4 was chosen, an optimal value for N would be:

$$((\text{m}\pm\text{nimum\_size\_for\_a\_freelist\_candidate in bytes}/2)/\text{object\_grain\_size in bytes}).$$

where minimum_size_for_a_freelist_candidate is the smallest unit added to the free storage data structure.

Typically, the minimum_size_for_a_freelist_candidate is same as the predetermined minimum unit. A single portion of free storage available for reallocation that is greater than or equal to the minimum_size_for_a_freelist_candidate is referred to as a free chunk.

For example, assuming minimum_size_for_a_freelist_candidate=512 bytes for the earlier example, this would give N=((512/2)/4)=64. This would give a meta-mark-map of size (31.250MB/64)=0.488MB.

Considering the meaning of set and unset bits in the meta-mark-map, in the present example it is assumed that:
- All meta-mark-map bits are set corresponding to a single object in the heap. A set meta-mark-map bit need not be set again.
- The amount of storage represented by a meta-mark bit is half the minimum_size_for_a_freelist_candidate. That is to say, one unset bit (with adjoining set bits, if any) may or may not represent a free chunk of 512 bytes or more whereas two, or more, consecutive unset bits will represent a free chunk of 512 bytes or more.

Referring again to the overview of FIG. 2, the three sweep phase approaches 401-403 will now be described in detail.

Figure 5:
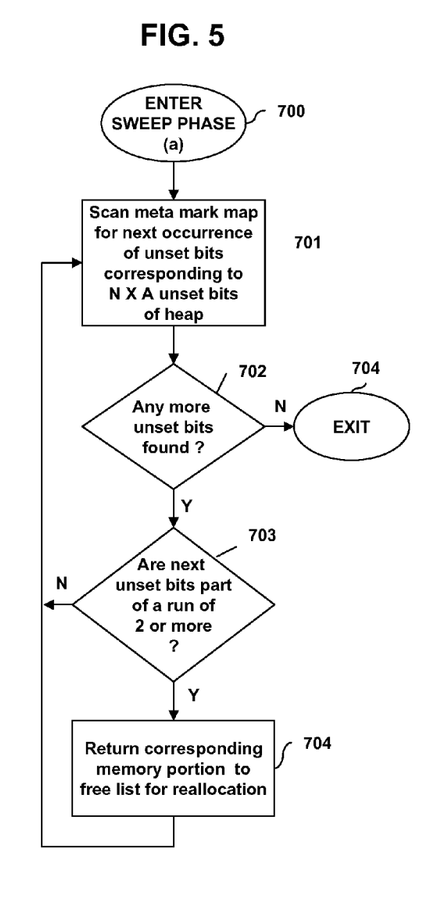
FIG. 5 is a flow diagram showing more detail of a conservative sweep phase option (a) shown in FIG. 2.

Firstly, the conservative approach (a) of step 401 is illustrated in FIG. 5. This relies on the meta-mark-map alone to identify garbage. After entering the sweep phase at 700, the first step 701 is to scan the meta-mark-map 300 for the first (more generally, the next) occurrence of unset bit(s) (each corresponding to N×A bits of heap 100). If unset bits are found at step 702, the program proceeds to step 703, otherwise it exits at 704. Step 703 determines if the unset bit(s) found are part of a run of two or more. If they are, then a chunk of reallocatable storage of at least the minimum_size_for_a_freelist_candidate has been found and may be returned to the free list 540 for reallocation in step 704.

The collection method described in FIG. 5 potentially offers the greatest return of free storage in the minimum time, in that it ignores dead data objects of less than half the predetermined minimum unit size. However, the method will only be useful where the heap contains large amounts of dead data objects and is not overly fragmented. Such a method may be described as "conservative" in that it identifies only storage chunks which are large enough to be definitely available for reallocation and ignores smaller chunks which may nevertheless have been combinable to produce more storage for reallocation.

Figure 6:
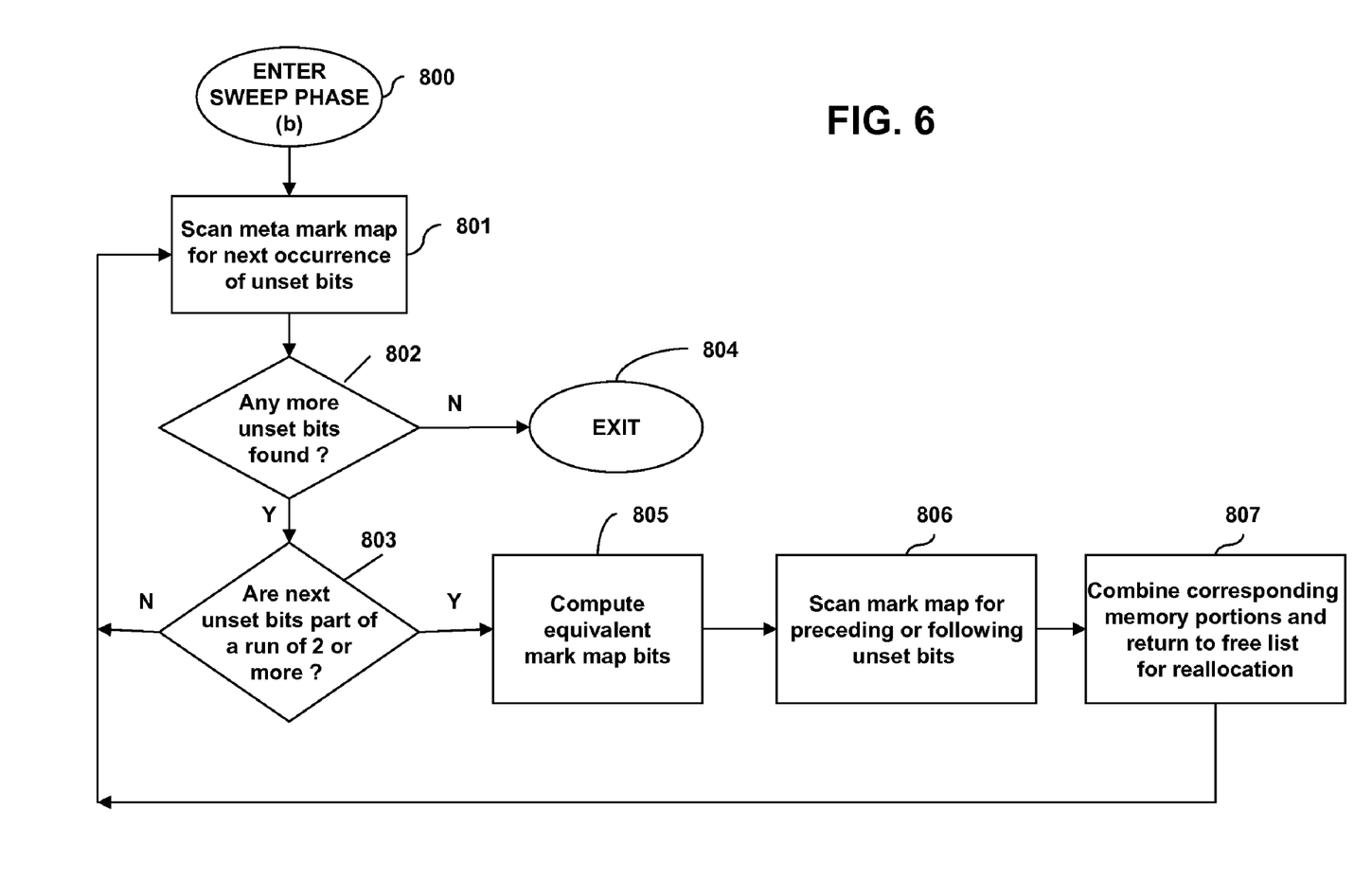
FIG. 6 is a flow diagram showing more detail of an intermediate sweep phase option (b) shown in FIG. 2.

An intermediate approach, which increases the amount of free storage for reallocation is that of option (b), step 402, in FIG. 2, described in more detail in FIG. 6. Effectively, this is an extension of the method of FIG. 5 which makes use of the mark-map data as well, in a secondary phase of the sweep.

The method is identical to that of FIG. 5 in its initial steps: after entering sweep phase option (b) at 800, the meta-mark-map 300 is scanned for the first (or more generally the next) unset bits in step 801 and then a test is performed in step 802 as to whether unset bits were found. Thus, quick identification is made, by reference to the meta-mark-map bits of all the half minimum free list chunk sized portions of the heap which contain garbage and are therefore potentially available for reallocation. If none are found, an exit 804 is taken as before. If unset bits were found, in step 803 of FIG. 6, it is again determined whether the unset bits are part of a run of two or more. At this point, the two methods diverge.

In FIG. 6, instead of simply returning the corresponding chunks of storage to the free list, as in FIG. 5, the mark-map bits equivalent to the detected unset meta-mark-map bits are computed in step 805. It is possible that the heap portions corresponding to the computed mark-map bits are bordered by some further potential contiguous free storage space containing dead objects. This is determined, in step 806, by checking the location of the immediately preceding and following set physical bits in the mark-map 300 and calculating the size of the live objects as described above. Unused or dead units within the respective half minimum free list chunks bordering the already identified heap portions can then be added to these portions and returned with them as a combined unit to the free list for reallocation in step 807.

As applied to the example maps of FIG. 1, meta-mark-map bytes 8 and 9 form such a run of two or more unset bits and would be detected by step 803. The equivalent mark-map bits, computed by step 805 are bytes 29 to 36. Step 806 would then search the mark-map for preceding and following set bits (in this illustration, only the preceding set bit 24 is shown). The object size would be computed and determined to extend to mark-map bit 27, leaving bit 28 as indicating presumed free space available for reallocation. The corresponding heap storage byte 28 is then combined with already identified bytes 29-36 and the memory portion corresponding to bytes 28-36 is returned as a whole chunk to the free list. Thus, more storage is potentially returned than would have been using only the meta-mark-map and method of FIG. 5. The penalty is a longer sweep phase.

Figure 7:
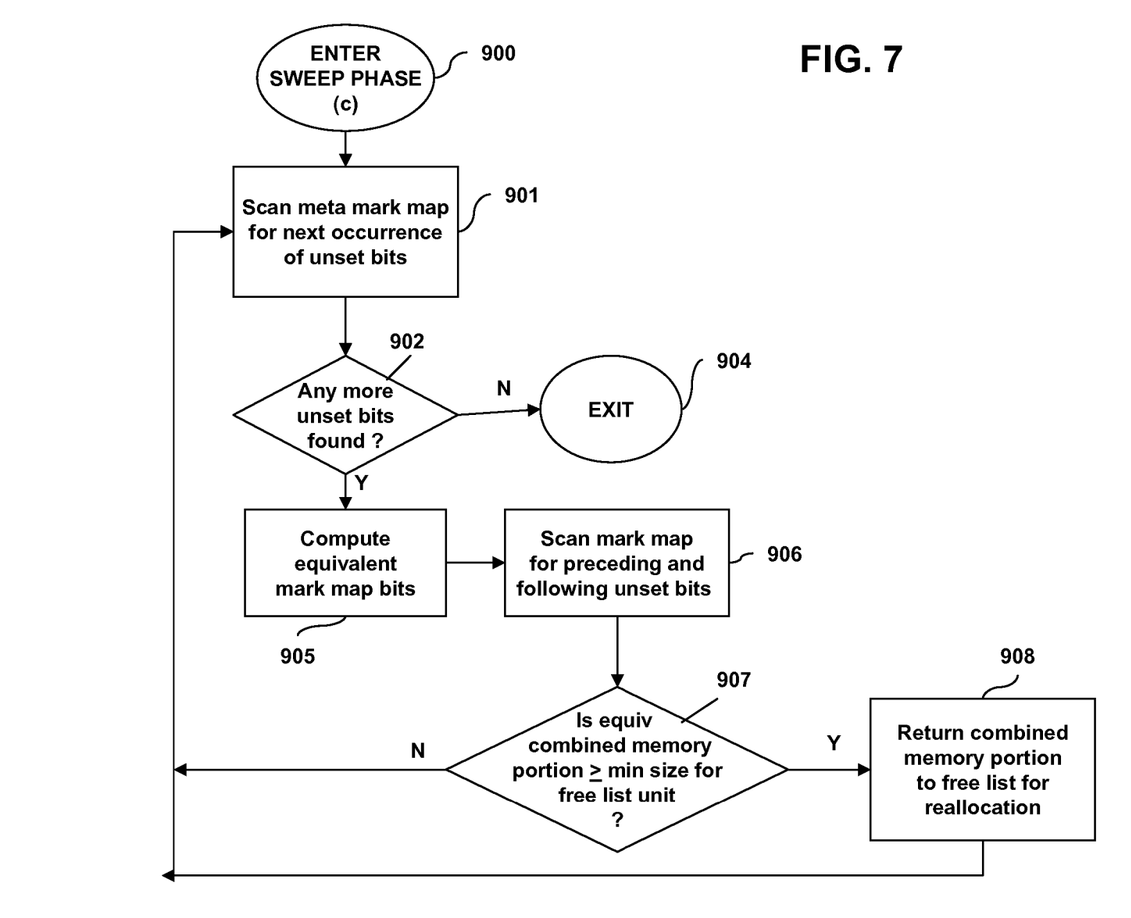
FIG. 7 is a flow diagram showing more detail of a non-conservative sweep phase option (c) shown in FIG. 2.

FIG. 7 illustrates the non-conservative option (c) shown as 403 in FIG. 2 for recovering the maximum amount of garbage. Steps 900, 901, 902 and 904 are identical to the similarly numbered initial steps of FIGS. 5 and 6 for identifying the occurrence of unset bits in the meta-mark-map. However, in step 905, as soon as any unset bits are identified by step 902, the equivalent mark-map bits are computed so that storage corresponding to single unset meta-mark-map bits is also identified. In step 906, similarly to step 806 of FIG. 6, the mark-map is scanned for the immediately preceding and following set bits and the amount of contiguous additional free space computed using the known size of the live objects.

Unlike in the intermediate option of FIG. 6, because step 902 may have identified only a single unset meta-mark-map bit, corresponding to only half the minimum size of a free list unit, it is not known immediately whether any additional free space contiguous to this will, when combined with the initially identified half unit, amount to the minimum size or not. This is determined in step 907 and, if the combined free space amounts to the minimum_size_for_a_freelist_candidate, it is returned to the free list for reallocation. Otherwise, it is ignored and the program returns to step 901 to search for the next unset bit in the meta-mark-map. Thus, the technique of FIG. 7 maximises the collection of garbage by identifying all possible chunks of minimum_size_for_a_freelist_candidate or greater. This will potentially produce more returned storage than either of the other methods but, again at the expense of further processing time. Of course, it will be realised that both preceding and following additional free space must be present for a half minimum size unit to be combinable into a full minimum size unit. There is, in fact, no example of this illustrated in the map diagrams of FIG. 1 where the mark-map bits 17-20, corresponding to the single unset meta-mark-map bit 5, are not bordered by the necessary four further bits to make up a minimum size free list unit. For example, had bit 16 been unset, a further unit would however, have been identifiable for reallocation.

Some additional considerations relating to the building and use of the meta-mark-map for relatively negligible cost in terms of pause time are:

The initialisation of, and subsequent updates to, a meta-mark-map has some cost. It is important to ensure that this cost is negligible.

The majority of the work (e.g., populating the mark-map and the meta-mark-map) can be done during concurrent marking phase for free (free from pause time perspective, producing negligible throughput hit).

Remaining cleanup work can be done in final concurrent collection (in conventional phases of final card cleaning and stop-the-world mark) for a relatively negligible cost.

The footprint overhead is assumed to be negligible. For example, in the examples above, a 1000MB heap with 31.250MB mark-map overhead will have an added overhead of 0.488 MB.

The method embodied in FIG. 2 step 401 and FIG. 5 represents the simplest use of a meta-mark-map. By selecting contiguous pairs of unset bits in the meta-mark-map 300, free list chunks of minimum_size_for_a_freelist_candidate bytes or more are quickly identified and returned to the free list for reallocation. This is a much faster operation than analysing the mark-map 200 because of the much smaller size of the meta-mark-map and due to cache locality performance, albeit at the cost of ignoring smaller portions of inaccessible storage in heap memory 100. It is effectively a cherry-picking approach.

The technique of FIG. 5 is most effective when the heap is not very fragmented or when the heap occupancy is low, i.e., the heap contains large quantities of inaccessible (dead) data, for example, if the application program creates mostly short-lived objects; or when the heap size is huge, for example, several gigabytes. If this is not the case, a modified approach may be necessary, as illustrated in FIG. 7. FIG. 6, as described, is an intermediate approach.

Which option to select in step 404 of FIG. 2 and when to apply the selection is predetermined and various possibilities arise. It would be possible, for example, for different approaches to be used in succession, and to switch between them when appropriate conditions arise. For example, the conservative option of FIG. 5 could always be used to start garbage collection with a switch to the method of FIG. 7 taking place upon an indication that the method of FIG. 5 has failed to locate any storage for reallocation. Alternatively, the switch might take place if a monitored metric passes a threshold value. Such a metric, might, for example, be the degree of occupancy or fragmentation of the heap or the permissible maximum pause time.

It will be understood that the benefits of using the meta-mark-map 300 can be summarised as follows:

The meta-mark-map 300 is much smaller, and so can be touched and walked over much more quickly, than the mark-map 200. In an ideal scenario, 0.488MB is much less memory to touch and walk over than 31.250MB; in a realistic scenario, overall memory touched and walked is significantly less than 31.250MB.

The meta-mark-map 300 can be read one word at a time (like mark-map 200 heretofore). This is an added advantage, since N*object_grain_size*word_size bytes of heap can be scanned with a single register comparison operation (or 64*4*32 bytes=8,096 bytes in the earlier example for a 32-bit system with word_size=32); this compares to a scan of (object_grain_size*word_size) with a single register comparison operation for the existing implementation (or 4*32 bytes=128 bytes in the earlier example). Therefore, a complete scan of heap needs much fewer register comparison operations.

The main benefit will be for large heaps, but performance improvements should also be seen on smaller heaps.

It will be understood that a further optimisation would be to have a hierarchy of meta-mark-maps depending on the size of the heap, units of a mark-map higher in the hierarchy representing respectively pluralities of units of a mark-map lower in the hierarchy.

It will also be understood that a further optimisation would use the meta-mark-map scheme described above for stop-the-world mark phase when running without concurrent functionality.

It will be appreciated that the novel garbage collection scheme using the meta-mark-map described above is carried out in software running on a processor in one or more computers, and that the software may be provided as a computer program element carried on any suitable data carrier (not shown) such as a magnetic or optical computer disc.

It will be understood that further modifications to the example described above may be made by a person of ordinary skill in the art without departing from the scope of the present invention.

The invention claimed is:

1. A method for dynamically managing storage of a set of data objects generated during an execution of a computer program in a dedicated area of memory, wherein the set of data objects become inaccessible to the computer program during the execution of the computer program, the method comprising the steps of:

locating the set of data objects stored in the dedicated area of memory;

in response to locating the set of data objects, producing a map of at least a part of the dedicated area of memory having a plurality of map entries, wherein each entry in the plurality of map entries corresponds to a fixed size portion of the dedicated area of memory, and wherein each entry in the plurality of map entries indicates whether the fixed size portion of the dedicated area of memory contains a set of accessible data objects;

selecting, with reference to the plurality of map entries, a set of contiguous portions of the dedicated area of memory not containing the set of accessible data objects, wherein a unit size of the set of contiguous portions of the dedicated area of memory is at least a predetermined minimum unit size, and wherein the predetermined minimum unit size is a smallest unit of memory added to a free storage data structure, wherein the free storage data structure maintains a set of free portions of the dedicated area of memory available for storage of the set of data objects; and returning a set of selected contiguous portions of the dedicated area of memory not containing the set of accessible data objects to the free storage data structure for reallocation of storage to the computer program.

2. The method as claimed in claim 1 in which the fixed size portion of the dedicated area of memory is half the predetermined minimum unit size.

3. The method as claimed in claim 1, wherein the set of selected contiguous portions of the dedicated area of memory comprises a plurality of contiguous fixed size portions of the dedicated area of memory.

4. The method as claimed in claim 1 in which the map is a secondary map, wherein each entry in the secondary map corresponds to a respective plurality of primary map entries generated from the dedicated area of memory, wherein each entry in the plurality of primary map entries indicates whether a data stored in each of a smallest constituent unit of a data object is either accessible, inaccessible, or unassigned by the computer program.

5. The method as claimed in claim 4 in which the primary and secondary maps form a bit map, wherein each bit in the bit map constitutes a map entry.

6. The method as claimed in claim 5 in which the selecting step further comprises identifying a set of runs comprising a set of two or more unset secondary map bits and, for each run in the set of runs:
  identifying a set of unset primary map bits corresponding to the each run in the set of runs;
  scanning the primary map for a number of contiguous unset bits preceding and following an identified set of unset primary map bits;
  combining a first memory portion corresponding to the number of contiguous unset bits preceding and following the identified set of unset primary map bits with a second memory portion corresponding to the identified set of unset primary map bits, wherein combining the first memory with the second memory forms a combined memory portion; and
  returning the combined memory portion to the free storage data structure for reallocation.

7. The method as claimed in claim 5 in which the selecting step further comprises identifying a set of runs comprising a set of unset secondary map bits and, for each run in the set of runs:
  identifying a set of unset primary map bits corresponding to the each run in the set of runs;
  scanning the primary map for a number of contiguous unset bits preceding and following an identified set of unset primary map bits;
  responsive to a first memory portion corresponding to the number of contiguous unset bits preceding and following the identified set of corresponding unset primary map bits and a second memory portion corresponding to the identified set of corresponding unset primary map bits, together being at least equal the predetermined minimum unit size, combining the first memory portion and the second memory portion to form a combined memory portion; and
  returning the combined memory portion to the free storage data structure for reallocation.

8. The method as claimed in claim 5, including a sweeping step having a first, a second, and a third sweep configuration, wherein the sweeping step sweeps the primary and secondary maps, wherein a further step includes switching between the first, the second, and the third sweep configuration in accordance with a predetermined criteria, the sweeping step further comprising:
  in the first sweep configuration, the selecting step identifies a set of runs comprising a set of two or more unset secondary map bits and a set of portions of memory for return to the free storage data structure for reallocation;
  in the second sweep configuration, the selecting step identifies the set of runs comprising the set of two or more unset secondary map bits and, for each such run in the set of runs, identifies a set of unset primary map bits, scans the primary map for a number of contiguous unset bits preceding and following an identified set of unset primary map bits, and combines a first memory portion corresponding to the number of contiguous unset bits preceding and following the identified set of unset primary map bits with a second memory portion corresponding to the identified set of unset primary map bits for return to the free storage data structure for reallocation; and
  in the third sweep configuration, the selecting step, for each run in the set of runs comprising the set of unset secondary map bits, identifies the set of unset primary map bits, scans the primary map for the number of contiguous unset bits preceding and following the identified set of unset primary map bits, and, combines a first memory portion corresponding to the number of contiguous unset bits preceding and following the identified set of unset primary map bits with a second memory portion corresponding to the identified set of unset primary map bits to form a combined memory portion, if the combination of the identified set of unset primary map bits and the number of contiguous unset bits preceding and following the identified set of unset primary map bits at least equals the predetermined minimum unit size, and returns the combined memory portion to the free storage data structure for reallocation.

9. The method as claimed in claim 5 in which a ratio of primary to secondary bits in the bit map is equal to half the predetermined minimum unit size divided by the smallest constituent unit of a data object.

10. The method as claimed in claim 1 in which the producing step produces a second map of the entire dedicated area of memory, execution of the computer program being halted until after the selecting and returning steps are complete.

11. The method as claimed in claim 1 in which the map is a bit vector and the selecting step is arranged to read a plurality of bits at a time, and, if no bits indicating a presence of the set of accessible data objects are found, selecting all the portions of the dedicated area of memory corresponding to the plurality of bits which were read for return to the free storage data structure.

12. A computer program recorded on a physical storage device, the computer program comprising instructions for an execution in a data processing system, which instructions, when executed cause the data processing system to carry out a method for dynamically managing storage of a set of data objects, generated during the execution of an application program, in a dedicated area of memory, the set of data objects becoming inaccessible to the application program during the execution, the method comprising the steps of:
  locating the set of data objects stored in the dedicated area of memory;
  in response to locating the set of data objects, producing a map of at least a part of the dedicated area of memory having a plurality of map entries, wherein each entry in the plurality of map entries corresponds to a fixed size portion of the dedicated area of memory, and wherein each entry in the plurality of map entries indicates whether the fixed size portion of the dedicated area of memory contains a set of accessible data objects;

selecting, with reference to the plurality of map entries, a set of contiguous portions of the dedicated area of memory not containing the set of accessible data objects, wherein a unit size of the set of contiguous portions of the dedicated area memory is at least a predetermined minimum unit size, and wherein the predetermined minimum unit size is a smallest unit of memory added to a free storage data structure, wherein the free storage data structure maintains a set of free portions of the dedicated area of memory available for storage of the set of data objects; and returning a set of selected contiguous portions of the dedicated area of memory not containing the set of accessible data objects to the free storage data structure for reallocation of storage to the computer program.

13. The computer program as claimed in claim 12 in which the fixed size portion of the dedicated area of memory is half the predetermined minimum unit size.

14. The computer program as claimed in claim 12, wherein the set of selected contiguous portions of the dedicated area of memory comprises a plurality of contiguous fixed size portions of the dedicated area of memory.

15. The computer program as claimed in claim 12 in which the map is a secondary map, wherein each entry in the secondary map corresponds to a respective plurality of primary map entries generated from the dedicated area of memory, wherein each entry in the plurality of primary map entries indicates whether a data stored in each of a smallest constituent unit of a data object is either accessible, inaccessible, or unassigned by the computer program.

16. The computer program as claimed in claim 15 in which the primary and secondary maps form a bit map, wherein each bit in the bit map constitutes a map entry.

17. The computer program as claimed in claim 16 in which the selecting step further comprises identifying a set of runs comprising a set of two or more unset secondary map bits and, for each run in the set of runs:

identifying a set of unset primary map bits for the each run in the set of runs;

scanning the primary map for a number of contiguous unset bits preceding and following an identified set of unset primary map bits;

combining a first memory portion corresponding to the number of contiguous unset bits preceding and following the identified set of unset primary map bits with a second memory portion corresponding to the identified set of unset primary map bits, wherein combining the first memory with the second memory forms a combined memory portion; and returning the combined memory portion to the free storage data structure for reallocation.

18. The computer program as claimed in claim 16 in which the selecting step further comprises identifying a set of runs comprising a set of unset secondary map bits and, for each run in the set of runs:

identifying a set of unset primary map bits corresponding to the each run in the set of runs;

scanning the primary map for a number of contiguous unset bits preceding and following an identified set of unset primary map bits;

responsive to a first memory portion corresponding to the number of contiguous unset bits preceding and following the identified set of unset primary map bits and a second memory portion corresponding to the identified set of unset primary map bits, together being at least equal the predetermined minimum unit size, combining the first memory portion and the second memory portion to form a combined memory portion; and returning the combined memory portion to the free storage data structure for reallocation.

19. The computer program as claimed in claim 16, including a sweeping step having a first, a second, and a third sweep configuration, wherein the sweeping step sweeps the primary and secondary maps, wherein a further step includes switching between the first, the second, and the third sweep configuration in accordance with a predetermined criteria, the sweeping step further comprising:

in the first sweep configuration, the selecting step identifies a set of runs comprising a set of two or more unset secondary map bits and a set of portions of memory for return to the free storage data structure for reallocation;

in the second sweep configuration, the selecting step identifies the set of runs comprising the set of two or more unset secondary map bits and, for each such run in the set of runs, identifies a set of unset primary map bits, scans the primary map for a number of contiguous unset bits preceding and following an identified set of unset primary map bits, and combines a first memory portion corresponding to the number of contiguous unset bits preceding and following the identified set of unset primary map bits with a second memory portion corresponding to the identified set of unset primary map bits for return to the free storage data structure for reallocation; and in the third sweep configuration, the selecting step, for each run in the set of runs comprising the set of unset secondary map bits, identifies the set of unset primary map bits, scans the primary map for the number of contiguous unset bits preceding and following the identified set of unset primary map bits, and, combines a first memory portion corresponding to the number of contiguous unset bits preceding and following the identified set of unset primary map bits with a second memory portion corresponding to the identified set of unset primary map bits to form a combined memory portion if the combination of the identified set of unset primary map bits and the number of contiguous unset bits preceding and following the identified set of unset primary map bits at least equals the predetermined minimum unit size, and returns the combined memory portion to the free storage data structure for reallocation.

20. The computer program as claimed in claim 16 in which a ratio of primary to secondary bits in the bit map is equal to half the predetermined minimum unit size divided by the smallest constituent unit of a data object.

21. The computer program as claimed in claim 12 in which the producing step produces a second map of the entire dedicated area of memory, execution of the computer program being halted until after the selecting and returning steps are complete.

22. The computer program as claimed in claim 12 in which the map is a bit vector and the selecting step is arranged to read a plurality of bits at a time, and, if no bits indicating a presence of the set of accessible data objects are found, selecting all the portions of the dedicated area of memory corresponding to the plurality of bits which were read for return to the free storage data structure.

23. A storage management system for dynamically managing storage of a computer program generating a set of data objects in a dedicated area of memory forming part of a data processing system, the storage management system comprising:

means for locating the set of data objects stored in the dedicated area of memory;

in response to locating the set of data objects, means for producing a map of at least a part of the dedicated area of memory having a plurality of map entries, wherein each entry in the plurality of map entries corresponds to a fixed size portion of the dedicated area of memory, and wherein each entry in the plurality of map entries indicates whether the fixed size portion of the dedicated area of memory contains a set of accessible data objects;

means for selecting, with reference to the plurality of map entries, a set of contiguous portions of the dedicated area of memory not containing the set of accessible data objects, wherein a unit size of the set of contiguous portions of the dedicated area memory is at least a predetermined minimum unit size, and wherein the predetermined minimum unit size is a smallest unit of memory added to a free storage data structure, wherein the free storage data structure maintains a set of free portions of the dedicated area of memory available for storage of the set of data objects; and means for returning a set of selected contiguous portions of the dedicated area of memory not containing the set of accessible data objects to the free storage data structure for reallocation of storage to the computer program.

24. The system as claimed in claim 23 in which the fixed size portion of the dedicated area of memory is half the predetermined minimum unit size.

25. The system as claimed in claim 23, wherein the set of selected contiguous portions of the dedicated area of memory comprises a plurality of contiguous fixed size portions of the dedicated area of memory.

26. The system as claimed in claim 23 in which the map is a secondary map, wherein each entry in the secondary map corresponds to a respective plurality of primary map entries generated from the dedicated area of memory, wherein each entry in the plurality of primary map entries indicates whether a data stored in each of a smallest constituent unit of a data object is either accessible, inaccessible, or unassigned by the computer program.

27. The system as claimed in claim 26 in which the primary and secondary maps form a bit map, wherein each bit in the bit map constitutes a map entry.

28. The system as claimed in claim 27 in which the selecting means is arranged to identify a set of runs comprising a set of two or more unset secondary map bits and, for each run in the set of runs, to identify a set of unset primary map bits corresponding to the each run in the set of runs, scan the primary map for a number of contiguous unset bits preceding and following an identified set of unset primary map bits, and to combine a first memory portion corresponding to the number of contiguous unset bits preceding and following the identified set of unset primary map bits with a second memory portion corresponding to the identified plurality of unset primary map bits, wherein combining the first memory with the second memory forms a combined memory portion;

the returning means being effective to return the combined memory portion to the free storage data structure for reallocation.

29. The system as claimed in claim 27 in which the selecting means is arranged to identify a set of runs comprising a set of unset secondary map bits and, for each run in the set of runs, to identify a set of unset primary map bits corresponding to the each run in the set of runs, to scan the primary map for a number of contiguous unset bits preceding and following an identified set of unset primary map bits, and, responsive to a first memory portion corresponding to the number of contiguous unset bits preceding and following the identified set of unset primary map bits and a second memory portion corresponding to the identified set of unset primary map bits, together being at least equal the predetermined minimum unit size, to combine the first memory portion and the second memory portion to form a combined memory portion;

the returning means being effective to return the combined memory portion to the free storage data structure for reallocation.

30. The system as claimed in claim 27, including a sweeping means having a first, a second and a third sweep configuration and a switching means for switching between the first, the second, and the third sweep configuration in accordance with a predetermined criteria; wherein, in the first sweep configuration, the selecting means is arranged to identify a set of runs comprising a set of two or more unset secondary map bits and a set of portions of memory for return to the free storage data structure for reallocation;

in the second sweep configuration, the selecting means is arranged to identify the set of runs comprising the set of two or more unset secondary map bits and, for each such run in the set of runs, to identifying a set of unset primary map bits, scan the primary map for a number of contiguous unset bits preceding and following an identified set of unset primary map bits, and to combine a first memory portion corresponding to the number of contiguous unset bits preceding and following the identified set of unset primary map bits with a second memory portion corresponding to the identified set of unset primary map bits for return to the free storage data structure for reallocation; and in the third sweep configuration, the selecting means is arranged for each run in the set of runs comprising the set of unset secondary map bits to identify the set of unset primary map bits, to scan the primary map for the number of contiguous unset bits preceding and following the identified set of unset primary map bits, and, combines a first memory portion corresponding to the number of contiguous unset bits preceding and following the identified set of unset primary map bits with a second memory portion corresponding to the identified set of unset primary map bits to form a combined memory portion if the combination of the identified set of unset primary map bits and the number of contiguous unset bits preceding and following the identified set of unset primary map bits at least equals the predetermined minimum unit size, and to return the combined memory portion to the free storage data structure for reallocation.

31. The system as claimed in claim 27 in which a ratio of primary to secondary bits in the bit map is equal to half the predetermined minimum unit size divided by the smallest constituent unit of a data object.

32. The system as claimed in claim 23 in which the means for producing is effective to produce a second map of the entire dedicated area of memory and for halting execution of the computer program during operation of the selecting means and the returning means.

33. The system as claimed in claim 23 in which the map is a bit vector and the selecting means is arranged to read a plurality of bits at a time, and if no bits indicating a presence of the set of accessible data objects are found, to select all the portions of the dedicated area of memory corresponding to the plurality of bits which were read for return to the free storage data structure.

* * * * *